D. C. SOUTHWORTH & F. I. HARDY.
FISHING REEL.
APPLICATION FILED AUG. 8, 1914.

1,296,871.

Patented Mar. 11, 1919.

Witnesses:
Charlotte Sandage
John Mountain

Dewitt C. Southworth
Francis I. Hardy
Inventors.
By George J. Oltsch
Attorney.

UNITED STATES PATENT OFFICE.

DEWITT C. SOUTHWORTH AND FRANCIS I. HARDY, OF SOUTH BEND, INDIANA.

FISHING-REEL.

1,296,871.  Specification of Letters Patent.  Patented Mar. 11, 1919.

Application filed August 8, 1914. Serial No. 855,787.

*To all whom it may concern:*

Be it known that we, DEWITT C. SOUTHWORTH and FRANCIS I. HARDY, citizens of the United States, residing at South Bend, in the county of St. Joseph and State of Indiana, have invented certain new and useful Improvements in Fishing-Reels, of which the following is a specification.

The invention relates to an improvement in fishing reels, being particularly directed to a reel in which the spool is supported by a single bearing, and constructed with a particular view to delicate and efficient braking when required.

One of the essential objects of the present invention is the provision of a fishing reel constructed to dispose the spool in position to present a smooth uninterrupted disk for convenient contact from the thumb of the user, permitting a delicate and efficient braking operation as required.

A further object is the support of the reel on a single bearing of post-like formation projecting from the reel seat plate, and preferably disposed at a slight angle thereto so that the plane of the spool is in line with the tip of the rod.

The invention will be described in the following specification, reference being had to the accompanying drawings, in which.

Figure 1:
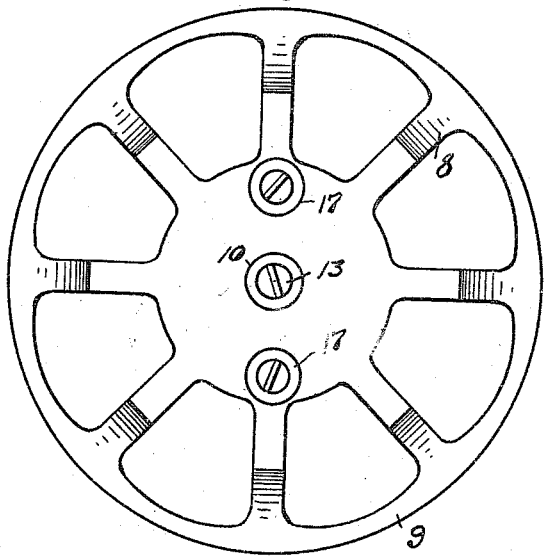
Figure 1 is a bottom plan view of the reel.

In constructing the improved reel, it is understood that various sizes are contemplated, as well as the use of any appropriate material, though in the latter instance it is preferred to use aluminum, to provide strength and lightness.

The reel in its essential structure comprises two parts, a reel seat plate 1, and a spool 2. The reel seat plate comprises an elongated plate-like strip 3, shaped transversely to conform to the reel seat 4' of the rod, as is usual in removable reel structures. A post 4 projects laterally from the plate 3, said post having a reduced bearing portion 5 projecting from the end thereof, the post being recessed for a portion of its length from the free outer end to provide an annular recess 6 surrounding the bearing portion or member 5.

The spool 2 comprises a circular disk 7 from the free or outer peripheral edge of which project in spaced relation the semicircular arms 8, which together form the line-receiving space. The free ends of the arms lying in the same plane on opposite sides of the disk 7 are connected by rings 9, as shown. The structure thus far described forms a skeleton integrally-constructed spool for the reception of the line.

The disk 7 is centrally formed with a bearing sleeve 10 projecting on opposite sides of said disk and having an exterior diameter corresponding to the similar dimension of the post 4. The sleeve on one side having a reduced extension 11 to seat in the bearing recess 6, is further centrally formed with a bore 12 to receive the bearing member 5. The sleeve is secured in removable bearing relation on the bearing member by a screw 13 threaded into the end of the bearing member 5 and having a head of greater diameter than the similar dimension of the bearing member, the end of the sleeve being interiorly recessed at 14 to receive the head.

That side of the disk 7 next the seat plate 3 is perfectly smooth and uninterrupted between the arms 8 and the sleeve 10, the opposing surface of the disk, that is the outer surface being provided, preferably at diametrically opposite points, with integral posts 15 on which, through the medium of set screw 16, are arranged freely rotatable sleeves 17. This construction affords a means for the manual manipulation of the reel, in winding or the like, as will be understood.

The bearing connection between the reel seat plate and the spool is important. It will be noted that the spool sleeve extension 11 seats in a recess in the post 4 of the seat plate, and that the outer wall of this recess 6 is of sufficient length to extend well within the plane of the adjacent side ring 9, or, more, specifically, said wall is of a length to extend between the central disk and the relatively inner ring. Under this construction it will be noted that there is no revolving part of the bearing between the plane of the inner ring 9 and the seat plate 3, but that an immovable fixed surface is provided throughout and beyond this distance. Therefore in any tendency of the line to overrun or leave the spool in casting or the like, such line would not become tangled due to its contact with a revolving part on this bearing. There is no revolving part here for the line to engage. This is important particularly in reels, as the tangling of the line incident to the overrunning of the same in casting is largely due to the engagement of the line with a revolving part of the reel beyond the spool. Furthermore this particular type of bearing presents no broken surface and no crevice for the line to enter in the event of overrunning, and hence the liability of breakage of the line is avoided.

Figure 2:
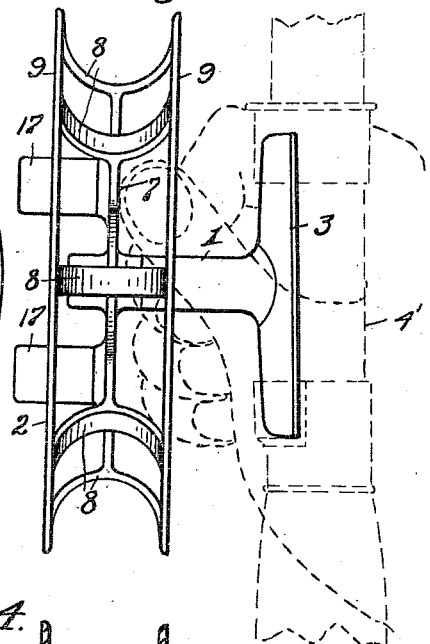
Fig. 2 is an edge view of the same, shown applied.
Figure 3:
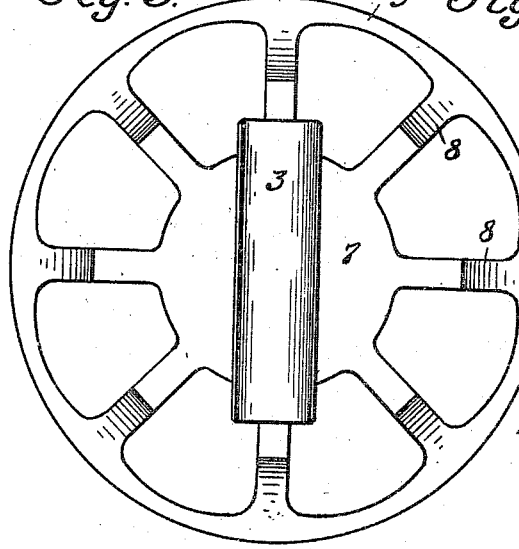
Fig. 3 is a top plan of the reel.
Figure 4:
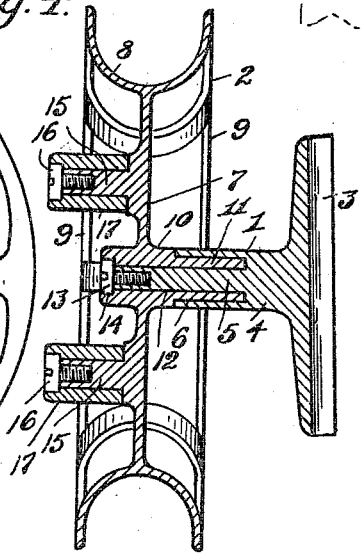
Fig. 4 is a vertical section of the reel.

With the reel applied it will be obvious that from the slight inclination of the post 4, as clearly shown in Figs. 2 and 4 of the drawings, the plane of the reel is more or less in line with the tip of the rod, so that the line in being unwound from or wound upon the reel travels in a straight line, and the consequent avoidance of winding the line in one place on the spool is secured. Furthermore, in the use of the reel, as will be apparent from Fig. 2 of the drawings, the thumb or finger of the user may, without disturbing the grasp upon the rod be brought to bear with more or less pressure upon the smooth, uninterrupted surface of the disk 7, thereby conveniently braking the reel in a manner to permit absolute accuracy and instantaneous adjustment as may be necessary.

What is claimed as new is:

A bearing for fishing reels having a seat plate and a disk centrally provided with a hollow sleeve projection beyond both surfaces of the disk and to a greater extent on one side than on the other, the greater portion of the maximum sleeve projection being reduced exteriorly to provide an exterior bearing surface, the seat plate having a fixed post longitudinally recessed to provide an inner bearing member to fit within the sleeve, and an outer member to overlie the reduced portion of the sleeve projection, the outer member being of less length than the inner member and terminating closer to the disk than to the seat plate.

In testimony whereof we affix our signatures in presence of two witnesses.

DEWITT C. SOUTHWORTH.
FRANCIS I. HARDY.

Witnesses:
L. W. COOK,
GEORGE J. OTTSCH.

Copies of this patent may be obtained for five cents each, by addressing the "Commissioner of Patents, Washington, D. C."